Patented Aug. 14, 1951

2,564,199

UNITED STATES PATENT OFFICE 2,564,199

CHLORINATED PARAFFIN ZINC-CONTAINING FLUX

Louis V. Feldman, Chicago, Ill., assignor to Continental Can Company, Inc., New York, N. Y., a corporation of New York No Drawing. Application January 26, 1949, Serial No. 73,005

13 Claims. (Cl. 148—25)

The following specification relates to an improved non-corrosive chlorinated flux for soldering purposes. All soldering fluxes are distinctly acid in their nature, and thus a source of frequent corrosion to the metal surfaces of the articles being soldered and to the machinery by which the soldering is accomplished. Slight quantities of soldering material are apt to splash onto the machinery and corrode it. The residue is frequently left as a sticky deposit which at best is objectionable if it remains, and is hard to remove completely.

The improved flux described below is an effective source of available chlorine for fluxing oxidized metal surfaces. However, it is more than usually stable and noncorrosive. After fluxing, any slight residue forms a very thin, hardly perceptible, waxy film which is not objectionable. In fact, it may be a protection for the metal surfaces.

One of the objects of my invention is to provide an improved flux which when spattered over soldering machinery will not leave any corrosive or sticky substances that may interfere with the proper operation of such machinery.

It is another object of my invention to provide an improved fluxing material which is free from any tendency to corrode metal parts.

A further object of my invention is to provide a flux which decomposes readily when heated into vaporizable compounds, leaving only a slight amount of residue which is easily removed mechanically.

A characteristic feature of my invention is that, any residue which creeps along the soldering surface and is not removed, will provide an extremely thin, waxy film, hardly perceptible, but definitely a protection to the metal surface.

My improved compound is extremely stable and free from decomposition during storage or at normal temperatures.

A still further object of my invention is to provide a fluxing compound which despite its maximum efficiency is extremely cheap in preparation.

Essentially, the improved flux depends upon utilizing chlorinated paraffin (chlorocosane) as a source of the available chlorine which fluxes or deoxides the surface preliminarily to soldering. Chlorinated paraffin is the reaction product of chlorine and saturated aliphatic hydrocarbons of the series $C_nH_{2n+2}$ obtainable from petroleum residue of low volatility where $n$ ordinarily ranges from 13 to 60. The three chlorinated paraffins that are available commercially at present are a 42% chlorinated paraffin of empirical formula $C_{26}H_{46.5}Cl_{7.5}$; a 50% chlorinated paraffin of empirical formula $C_{24}H_{40.8}Cl_{9.2}$ and a 70% chlorinated paraffin of empirical formula $C_{24}H_{29}Cl_{21}$.

This chlorinated paraffin retains its chlorine in composition during ordinary storage and handling, and the chlorine is not readily available if the material is used as a flux alone. For the purpose of releasing the chlorine, I have provided an organic zinc compound. This may be a suitable zinc soap. Thus, I may use zinc octoate (caprylate) or zinc naphthenate. The essential condition is that the soap shall combine with the chlorinated paraffin to release hydrogen chloride at soldering temperatures. The latter performs the usual deoxidizing action on the surface to be soldered.

The inorganic acid which is then free, is released in vapor form and is no longer a source of corrosion.

The chlorinated paraffin, with an appropriate organic zinc compound, can be supplied in a liquid medium in a variety of ways. Primarily, it may be carried in a solvent for both the chlorinated paraffin and the zinc compound. Aliphatic, aromatic or chlorinated hydrocarbons have generally recognized solvent properties suitable for this purpose. Hydrocarbons, such as toluene, xylene and light hydrocarbons serve this purpose. I have also successfully used mixed hydrocarbons as solvents. Such a one is available commercially and contains 75% naphthenes and 25% of aliphatic hydrocarbons. In like manner, the aliphatic alcohols such as butyl and amyl alcohols are well suited to serve as solvents for this fluxing compound.

In referring to solvent action, I also include dispersion of the chlorinated paraffin and zinc soap in water or in lower aliphatic alcohols such as ethyl or isopropyl alcohols.

As exemplifying typical formulations of the improved flux, the following are given.

Example 1

11.5% by weight of chlorinated paraffin containing
42% chlorine
3.5% zinc octoate
85% mixed hydrocarbon thinner above described.

As commercially obtained, the chlorinated paraffin contains 0.2% epichlorohydrin as a stabilizer.

This flux is a liquid which may be spread thinly over the metallic surface to be soldered. The zinc soap serves as an activator by which the chlorine is released from the chlorinated paraffin, presumably as a hydrochloride.

*Example 2*

11.5% by weight chlorinated paraffin containing 42% chlorine
3.5% zinc octoate
52% isopropyl alcohol
33% mixed hydrocarbon thinner.

This example varies from the one first given by the substitution of a lower aliphatic alcohol in place of part of the hydrocarbon thinner.

The use of the flux is the same as that described above.

The chlorinated paraffin may also contain higher proportions of chlorine. Two types are available containing respectively 50% and 70% chlorine. These are suitable for use, but are more stable, and thus require higher soldering temperatures.

The second example may also be varied by substituting zinc naphthenate for the octoate.

In like manner, some or all of the solvent may consist of toluene, xylene or similar hydrocarbon solvents.

The zinc soap lends itself well to dispersion in water or in a lower aliphatic alcohol by which the chlorinated paraffin is also brought into a dispersed condition.

*Example 3*

12% by weight chlorinated paraffin containing 42% chlorine
4% zinc octoate
2% agent for aqueous dispersion
82% water By preference I use dioctyl sodium sulphosuccinate, commercially known as Aerosol O T (Carbide & Carbon Corporation) as the agent for aqueous dispersion. However, it is merely one of numerous similar wetting agents that may be substituted.

Similar variations in the material selected are suggested by the examples given.

In other words, the organic zinc salt may be that of a lower aliphatic acid rather than the octoate and may be an aromatic compound other than the naphthenate. The solvent may be a lower hydrocarbon or aliphatic alcohol separately or in admixture. The requirements are satisfied equally well if instead of solution strictly speaking, the medium is an aqueous or alcohol dispersion.

As already explained, the soldering temperature causes the zinc soap to release the chlorine from the paraffin for the fluxing effect. The paraffin is generally volatilized or vaporized in the process.

Any small amount remaining on the surface of the metal forms a thin, waxy film which is practically imperceptible. It is free from corrosive action on the metal surface and so may remain indefinitely, in which case it has a protective effect.

What I claim is:

1. A soldering flux consisting of essentially chlorinated paraffin, a zinc soap and a volatile solvent.

2. A soldering flux consisting of essentially chlorinated paraffin and an organic zinc salt in a volatile liquid medium.

3. A soldering flux consisting of essentially chlorinated paraffin, zinc octoate and a volatile hydrocarbon solvent.

4. A soldering flux consisting of essentially chlorinated paraffin, zinc octoate, isopropyl alcohol and a volatile hydrocarbon solvent.

5. A soldering flux consisting of essentially chlorinated paraffin, zinc naphthenate and a volatile hydrocarbon solvent.

6. A soldering flux consisting of essentially an aqueous dispersion of chlorinated paraffin and a zinc soap.

7. A soldering flux consisting of essentially chlorinated paraffin, and a minor proportion of zinc octoate dissolved in toluol.

8. A soldering flux consisting of essentially chlorinated paraffin, and a minor proportion of zinc octoate dissolved in xylene.

9. A soldering flux consisting of approximately twelve per cent by weight of chlorinated paraffin containing approximately 42 per cent chlorine; four per cent of an organic zinc salt and 84 per cent of a volatile organic solvent.

10. A soldering flux consisting of approximately twelve per cent by weight of chlorinated paraffin containing approximately 42 per cent chlorine; four per cent of zinc octoate and 84 per cent of a volatile mixed hydrocarbon solvent.

11. A soldering flux consisting of approximately twelve per cent by weight of chlorinated paraffin containing approximately 42 per cent chlorine; four per cent of zinc octoate; 52 per cent of isopropyl alcohol and 32 per cent of a volatile hydrocarbon solvent.

12. A soldering flux consisting of approximately twelve per cent by weight of chlorinated paraffin containing approximately 42 per cent chlorine; four per cent of zinc octoate and 84 per cent of a volatile mixture of naphthenes and aliphatic hydrocarbons.

13. A soldering flux consisting of approximately twelve per cent by weight of chlorinated paraffin stabilized by a fractional per cent of epichlorohydrin; four per cent of zinc octoate and 84 per cent of a volatile mixed hydrocarbon solvent.

LOUIS V. FELDMAN.

REFERENCES CITED

The following references are of record in the file of this patent:

UNITED STATES PATENTS

| Number | Name | Date |
| --- | --- | --- |
| 1,757,118 | Harris | May 6, 1930 |
| 1,838,370 | Dean et al. | Dec. 29, 1931 |
| 1,996,362 | Callis | Apr. 2, 1935 |